May 13, 1930.                         G. LINES                        1,758,121
SANDWICH TOASTING MACHINE
Original Filed Nov. 10, 1928
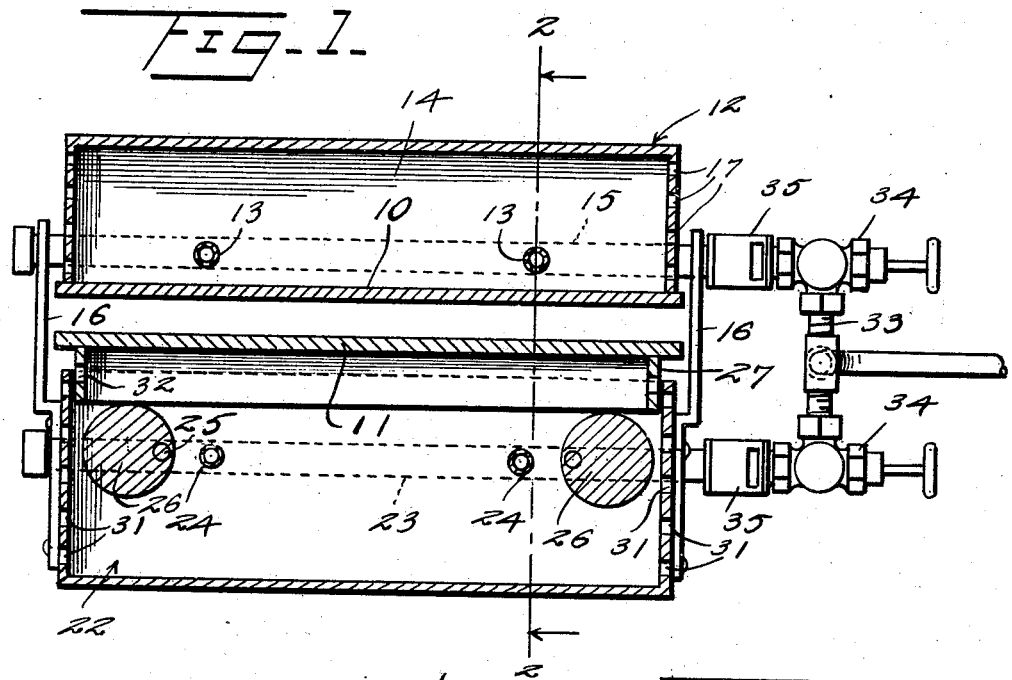
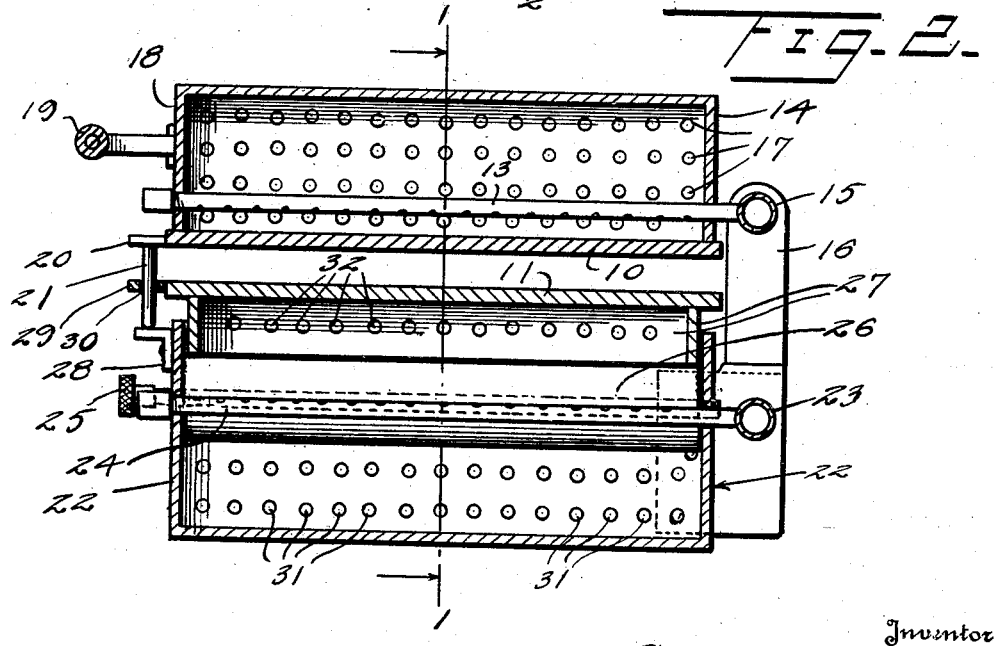
Inventor
Grant Lines
By Watson E. Coleman
Attorney Patented May 13, 1930

1,758,121

UNITED STATES PATENT OFFICE

GRANT LINES, OF FORT WORTH, TEXAS, ASSIGNOR OF ONE-THIRD TO S. N. BAKER, OF FORT WORTH, TEXAS

SANDWICH-TOASTING MACHINE

Application filed November 10, 1928, Serial No. 318,523. Renewed October 29, 1929.

This invention relates to sandwich toasting machines and more particularly to an improvement of that type of sandwich toasting machine illustrated in my prior Patent No. 1,649,963, granted November 22, 1927, for Sandwich toasting apparatus.

An important object of the present invention is the modification of the structure illustrated in the patent above referred to to enable the machine to be employed in toasting sandwiches of different thicknesses and permitting ready adjustment of the machine to adapt it to such variation in thicknesses.

A further object of the invention is the provision of a device of this character which, while primarily intended for use in toasting sandwiches, may be employed for simultaneously cooking opposite sides of bacon, meat balls, steaks, hot cakes or the like.

A further object of the invention is to simplify the structure illustrated in said patent and thereby enable the machine to be produced at a lower cost without in any manner reducing the efficiency or longevity thereof.

These and other objects I attain by the construction shown in the accompanying drawings, wherein for the purpose of illustration is shown a preferred embodiment of my invention and wherein:—

Figure 1 is a longitudinal vertical sectional view through a sandwich toasting machine constructed in accordance with my invention;

Figure 2 is a transverse vertical sectional view therethrough.

Referring now more particularly to the drawings, the numerals 10 and 11 generally indicate upper and lower plates, of which the upper plate 10 forms the lower wall of a casing 12 within which are disposed a plurality of burners 13. The burners 13 each project through the rear wall 14 of the casing and are rigidly secured to a manifold 15 disposed adjacent such rear wall. This manifold is rotatably mounted adjacent its opposite ends in openings formed in the upper ends of brackets 16, hereinafter to be more particularly described. The ends of the casing 12 are provided with perforations 17 permitting the passage of the products of combustion from the burners 13 and the front wall 18 has secured thereto a handle 19, by means of which the casing may be manipulated and rotated with the manifold 15 as an axis.

Beneath this handle, the forward edge of the upper plate is provided with an outstanding ear 20 to which is secured a downwardly projecting stop pin 21. The brackets 16 are secured to the rear wall of a casing 22 and in addition to the openings for mounting the manifold 15, provide a mounting for a second manifold 23. The casing 22 may or may not, as desired, be provided with a bottom wall.

The rear wall thereof is apertured for the passage of a plurality of burners 24 and the front and rear walls are apertured to provide pivot openings for the axes 25 of eccentric rollers 26. Upon these rollers rests the lower faces of depending flanges 27 formed upon the under surface of the bottom plate 11. The pivot shafts at the front face of the front wall of the casing 22 are provided with handles 28, whereby they may be rotated, and it will be obvious that by this rotation, the lower plate 11 may be raised or lowered through the limits permitted by the eccentric rollers 26 to cause this lower plate to approach or recede from the upper plate 10. This lower plate has an ear 29 similarly located to the ear 20 of the plate 10 and this ear has an aperture 30 for the passage of the pin 21. As in the case of the upper casing, the end walls of the casing 22 are perforated, as indicated at 31, and the flange 27 of the bottom plate where it opposes these end walls is likewise perforated, as indicated at 32.

The connection 33 between the manifolds 15 and 23 and a source of supply includes valves 34, the outlet ends of which are axially aligned with the manifolds and are connected therewith by air mixing sleeves 35 of any usual or ordinary construction. The sleeve 35 of the manifold 15 is rigidly secured to the manifold and has threaded engagement with its valve to compensate for the rotating movement of the manifold and, at the same time, provide a gas-tight connection. The connection 33 will be rigid to both valves 34 and to the manifold 23.

It will be obvious that with a structure of this character, it will be possible to immediately adjust the machine to adapt it to use with a sandwich of any desired thickness within the limits of the machine.

The pin 21 passing through the opening 30 of the ear 29 comes into engagement with a supporting bracket 36 upon the casing 22, so that the upper plate, when lowered, is always arranged in the same position. Thereby, by adjustment of the lower plate, a proper engagement of both plates with the sandwich can always be provided. In the use of the apparatus, the sandwich, meat ball or other article which is to be cooked is placed upon the lower plate while the upper plate is in elevated position, after which the upper plate is removed to its lowered position and the adjusting rollers employed to elevate the lower plate until the upper surface of the article comes into engagement with the upper plate. The cooking of both faces may thus be accomplished simultaneously and an article of any desired thickness within a reasonable range can be treated in this manner.

Since the construction hereinbefore set forth is capable of a certain range of change and modification without materially departing from the spirit of the invention, I do not limit myself to such specific structure except as hereinafter claimed.

I claim:—

1. In a sandwich toaster, a pair of superimposed casings adjacent faces of which are in the form of plates, burners within each casing for heating the associated plate, manifolds for the burners of each casing arranged at corresponding edges of said casings, a single gas feed connection for said manifolds maintaining said casings in spaced relation at such sides while permitting pivotal movement of one of the casings with relation to the other thereof, and means for adjusting one of said plates with relation to its casing to cause it to approach or recede from the plate of the other of the casings.

2. In a sandwich toaster, a pair of superimposed casings adjacent faces of which are in the form of plates, burners within each casing for heating the associated plate, manifolds for the burners of each casing arranged at corresponding edges of said casings, a single gas feed connection for said manifolds maintaining said casings in spaced relation at such sides while permitting pivotal movement of one of the casings with relation to the other thereof, the plate of the lower casing having a flange slidably engaging in the walls of the casing, and means within the casing controllable from the exterior thereof and engaging the flange of the plate for vertically adjusting the plate.

3. In a sandwich toaster, a pair of superimposed casings adjacent faces of which are in the form of plates, burners within each casing for heating the associated plate, manifolds for the burners of each casing arranged at corresponding edges of said casings, a single gas feed connection for said manifolds maintaining said casings in spaced relation at such sides while permitting pivotal movement of one of the casings with relation to the other thereof, means for adjusting one of said plates with relation to its casing to cause it to approach or recede from the plate of the other of the casings, a vertically projecting pin carried by the free edge of one of said casings, and a bracket carried by the other of the casings with which the end of said pin engages to limit the approach of the free edges of the casings toward one another.

4. In a sandwich toaster, a pair of superimposed casings adjacent faces of which are in the form of plates, burners within each casing for heating the associated plate, manifolds for the burners of each casing arranged at corresponding edges of said casings, a single gas feed connection for said manifolds maintaining said casings in spaced relation at such sides while permitting pivotal movement of one of the casings with relation to the other thereof, the plate of the lower casing having a flange slidably engaging in the walls of the casing, means within the casing controllable from the exterior thereof and engaging the flange of the plate for vertically adjusting the plate, a vertically projecting pin carried by the free edge of one of said casings, and a bracket carried by the other of the casings with which the end of said pin engages to limit the approach of the free edges of the casings toward one another.

5. In a sandwich toaster, a pair of superimposed casings adjacent faces of which are in the form of plates, burners within each casing for heating the associated plate, manifolds for the burners of each casing arranged at corresponding edges of said casings, a single gas feed connection for said manifolds maintaining said casings in spaced relation at such sides while permitting pivotal movement of one of the casings with relation to the other thereof, the plate of the lower casing having a flange slidably fitting the walls of the casing, and eccentric means engaging said flange for vertically adjusting said plate.

In testimony whereof I hereunto affix my signature.

GRANT LINES.